US009742582B2

(12) United States Patent
Hatae et al.

(10) Patent No.: US 9,742,582 B2
(45) Date of Patent: *Aug. 22, 2017

(54) HOUSE MONITORING SYSTEM

(71) Applicant: Panasonic Intellectual Property Management Co., Ltd., Osaka (JP)

(72) Inventors: Hiroyoshi Hatae, Fukuoka (JP); Koji Yamanishi, Fukuoka (JP); Hiroshi Tsuji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,999

(22) Filed: Jul. 20, 2016

(65) Prior Publication Data

US 2016/0328953 A1    Nov. 10, 2016

Related U.S. Application Data

(63) Continuation of application No. 14/679,791, filed on Apr. 6, 2015.

(30) Foreign Application Priority Data

Nov. 21, 2014  (JP) ................................ 2014-237043

(51) Int. Cl.
*H04M 11/00*  (2006.01)
*H04L 12/28*  (2006.01)
(Continued)

(52) U.S. Cl.
CPC .......... *H04L 12/2827* (2013.01); *G08B 13/08* (2013.01); *G08B 13/1966* (2013.01);
(Continued)

(58) Field of Classification Search
CPC ..... H04W 12/06; H04W 12/08; H04W 4/023; H04W 4/025; H04W 24/02
(Continued)

(56) References Cited

U.S. PATENT DOCUMENTS 8,842,180 B1    9/2014  Kasmir et al.
2003/0104800 A1  6/2003  Zak
(Continued)

FOREIGN PATENT DOCUMENTS

AU  2013204692 A1  10/2014
DE  102011054624 A1  4/2013
(Continued)

OTHER PUBLICATIONS

International Search Report and Written Opinion mailed Jul. 14, 2015, for corresponding International Application No. PCT/JP2015/001221, 11 pages.

*Primary Examiner* — Jean Gelin
(74) *Attorney, Agent, or Firm* — Seed IP Law Group LLP

(57) ABSTRACT

A house monitoring system includes at least one sensor that detects a predetermined event, a master device that communicates with the sensor, and is connected to a fixed telephone network so as to perform calls to other fixed telephones, and a mobile phone terminal that includes a display/input unit, performs wireless communication with the master device by using a wireless router, and is connected to other mobile phones via a mobile phone network. When the sensor detects the predetermined event, the master device transmits information regarding the sensor having detected the predetermined event to the mobile phone terminal, and the mobile phone terminal displays the information regarding the sensor having detected the predetermined event transmitted from the master device on the display/input unit.

20 Claims, 12 Drawing Sheets

(51) Int. Cl.
*G08B 13/196* (2006.01)
*G08B 25/08* (2006.01)
*G08B 13/08* (2006.01)
*G08B 17/10* (2006.01)
*G08B 25/10* (2006.01)
*H04W 76/00* (2009.01)
*H04W 12/08* (2009.01)
*H04M 1/725* (2006.01)

(52) U.S. Cl.
CPC . *G08B 13/19658* (2013.01); *G08B 13/19682* (2013.01); *G08B 17/10* (2013.01); *G08B 25/08* (2013.01); *G08B 25/10* (2013.01); *H04L 12/282* (2013.01); *H04L 2012/2841* (2013.01); *H04L 2012/2845* (2013.01); *H04M 1/72536* (2013.01); *H04W 12/08* (2013.01); *H04W 76/007* (2013.01)

(58) Field of Classification Search
USPC .... 455/404.1, 404.2, 410, 411, 414.1, 456.6, 455/457, 556.1, 557, 426.1, 426.2
See application file for complete search history.

(56) References Cited

U.S. PATENT DOCUMENTS

| | | | |
|---|---|---|---|
| 2004/0135685 | A1 | 7/2004 | Hane |
| 2008/0240387 | A1 | 10/2008 | Murai |
| 2010/0279664 | A1* | 11/2010 | Chalk .................... G08B 29/16 455/414.1 |
| 2010/0289644 | A1* | 11/2010 | Slavin ................ G08B 13/2402 340/568.1 |
| 2011/0003577 | A1* | 1/2011 | Rogalski ............. H04M 1/2725 455/404.1 |
| 2012/0008492 | A1 | 1/2012 | Arsenault et al. |
| 2012/0092158 | A1 | 4/2012 | Kumbhar et al. |
| 2015/0339912 | A1 | 11/2015 | Farrand et al. |

FOREIGN PATENT DOCUMENTS

| | | |
|---|---|---|
| JP | 2004-048164 A1 | 2/2004 |
| JP | 2005-352956 A1 | 12/2005 |
| JP | 2007-323533 A1 | 12/2007 |
| JP | 2009-026148 A1 | 2/2009 |
| JP | 2012-160801 A1 | 8/2012 |
| JP | 2013-207693 A1 | 10/2013 |
| WO | 2014/038199 A1 | 3/2014 |

\* cited by examiner

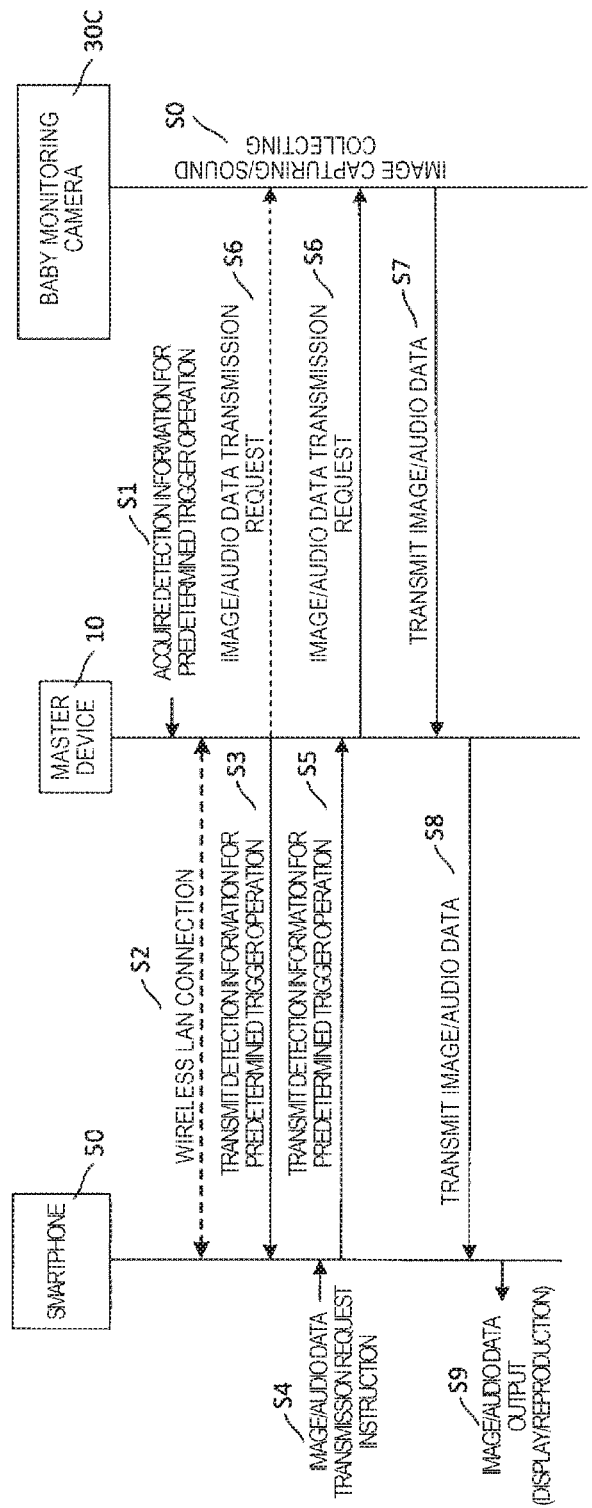

FIG. 11

| NAME | ID | INSTALLATION LOCATION | NOTIFICATION DESTINATION DEVICE |
|---|---|---|---|
| HUMAN SENSOR | 40A1 | ENTRANCE | SMARTPHONE, CORDLESS SLAVE DEVICE, FIXED TELEPHONE (TRANSMISSION DESTINATION) |
| HUMAN SENSOR | 40A2 | LIVING ROOM | SMARTPHONE, CORDLESS SLAVE DEVICE |
| HUMAN SENSOR | 40A3 | BEDROOM | SMARTPHONE |
| ... | ... | ... | ... | ial Field

HOUSE MONITORING SYSTEM

BACKGROUND

Technical Field

The present invention relates to a house monitoring system which monitors circumstances in a house.

Description of the Related Art

In the related art, as an example of a monitoring system for monitoring the inside of a house, there is a monitoring camera system which easily performs remote monitoring even from a remote location and monitors a monitoring target by using bidirectional communication of video and sound (for example, refer to Japanese Patent Unexamined Publication No. 2007-323533).

The monitoring system disclosed in Japanese Patent Unexamined Publication No. 2007-323533 includes a controller which is a monitoring server installed at an indoor distribution board in a predetermined house lot (within a house), a first camera unit which is an interphone slave device installed at an entrance door, a second camera unit which is installed in a dining room, a third camera unit which is installed in a bedroom, an indoor unit which is an interphone master device installed in a living room, and one or more mobile phones present at remote places. For example, in a case where a dweller is out, when each camera unit detects an intruder, the controller switches and transmits a captured video signal and a collected audio signal to the mobile phone so as to capture the intruder.

BRIEF SUMMARY

However, in the above-described configuration disclosed in Japanese Patent Unexamined Publication No. 2007-323533, since a video signal and an audio signal from each camera unit are appropriately switched and transmitted to the mobile phone so as to capture motion and sound of the intruder, a configuration of the controller is complex, and this inevitably leads to an increase in cost, and it is difficult to implement a monitoring system including the controller at low cost. In the above-described configuration disclosed in Japanese Patent Unexamined Publication No. 2007-323533, since detection of an intruder using a sensor is not taken into consideration, for example, there is a problem in that it is difficult to highly accurately monitor circumstances of a house in which a sensor is provided at a location where it is hard for the camera unit provided in the house to capture an image.

In order to solve the above-described problems, an object of the present invention is to provide a house monitoring system which realizes highly accurate monitoring of circumstances of a house at low cost by notifying a mobile phone terminal of an installation location of a sensor provided in a house even if a user does not know the installation location, by using an existing fixed telephone which is connected to a fixed telephone network and can perform calls to other fixed telephones.

According to the present invention, there is provided a house monitoring system including at least one sensor that detects a predetermined event; a master device that communicates with the at least one sensor, and is connected to a fixed telephone network so as to perform calls to other fixed telephones; and a mobile phone terminal that includes a display/input unit, performs wireless communication with the master device by using a wireless router, and is connected to other mobile phones via a mobile phone network, in which, when the sensor detects the predetermined event, the master device transmits information regarding the sensor having detected the predetermined event to the mobile phone terminal, and in which the mobile phone terminal displays the information regarding the sensor having detected the predetermined event transmitted from the master device on the display/input unit.

According to the present invention, it is possible to realize highly accurate monitoring of circumstances of a house at low cost by notifying a mobile phone terminal of an installation location of a sensor provided in a house even if a user does not know the installation location, by using an existing fixed telephone which is connected to a fixed telephone network and can perform calls to other fixed telephones.

BRIEF DESCRIPTION OF THE SEVERAL VIEWS OF THE DRAWINGS

FIG. 7 is a sequence diagram illustrating an example of an operation procedure in which the master device transmits and displays an image which is being recorded by the baby monitoring camera to the smartphone in the house monitoring system of the present embodiment;

FIG. 11 is a diagram illustrating an example of an alert notification destination list.

DETAILED DESCRIPTION

With reference to the drawings, a description will be made of an embodiment (hereinafter, referred to as "the present embodiment") of a house monitoring system related to the present invention. In the following present embodiment, as an example of a house monitoring system related to the present invention, an exemplary house monitoring system used for home security will be described. The present invention is not limited to a house monitoring system, and may be represented as each of devices constituting the house monitoring system, a method for each device, and a program.

A house monitoring system of the present embodiment includes at least one sensor (for example, human sensors 40A and 40B, smoke sensor 40C, and opening/closing sensor 40D which will be described later) that detects a predetermined event, a master device that communicates with the at least one sensor, and is connected to a fixed telephone network so as to perform calls to other fixed telephones, and a mobile phone terminal that includes a display/input unit, performs wireless communication with the master device by using a wireless router, and is connected to other mobile phones via a mobile phone network. When the sensor detects the predetermined event, the master device transmits information regarding the sensor having detected the predetermined event to the mobile phone terminal. The mobile phone terminal displays the information regarding the sensor having detected the predetermined event transmitted from the master device on the display/input unit.

Figure 1:
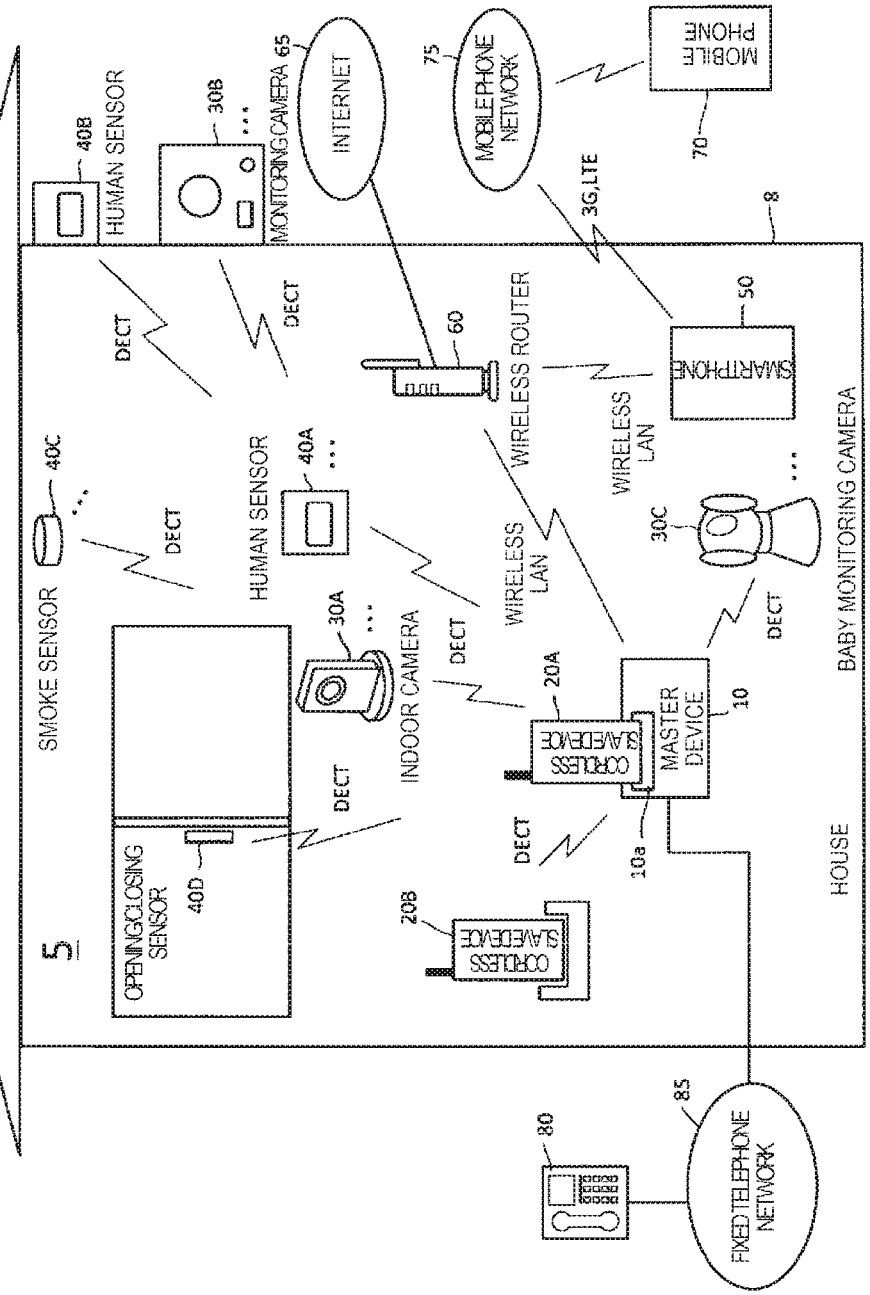
FIG. 1 is a diagram illustrating an example of a system configuration of a house monitoring system of the present embodiment.

FIG. 1 is a diagram illustrating a system configuration of house monitoring system 5 of the present embodiment. House monitoring system 5 is mainly provided in house 8, and includes master device 10, two cordless slave devices 20A and 20B (hereinafter, simply referred to as "slave devices"), a plurality of cameras (specifically, indoor camera 30A, monitoring camera 30B, baby monitoring camera 30C, . . . ), various sensors (specifically, human sensors 40A and 40B, smoke sensor 40C, opening/closing sensor 40D, . . . ), smartphone 50, and wireless router 60. A configuration of house monitoring system 5 is only an example and may be modified in various aspects.

Master device 10 which functions as a gateway in house monitoring system 5 is a control device which controls the entire operation of house monitoring system 5, and is connected to the slave devices, the cameras, the sensors, the smart plugs, and the like in a communicable manner by using a communication method such as digital enhanced cordless telecommunications (DECT). Master device 10 is connected to the Internet 65 via wireless router 60 using a wireless LAN. Master device 10 is connected to fixed telephone network 85 in a wired manner, and can perform a call to, for example, fixed telephone 80 which is designated as a transmission destination in advance by a user of smartphone 50 (hereinafter, simply referred to as a "user"). Master device 10 has a function of charging slave device 20A which is inserted into insertion port 10a.

Slave devices 20A and 20B are connected to master device 10 in the DECT communication method and can perform a call to master device 10. Particularly, in a case where two slave devices 20A and 20B are not required to be differentiated from each other, the slave devices are collectively referred to as slave device 20.

Various sensors 40 (specifically, human sensors 40A and 40B, smoke sensor 40C, opening/closing sensor 40D, . . . ) are connected to master device 10 in the DECT communication method. Herein, as sensors, opening/closing sensor 40D which detects opening and closing of a window, smoke sensor 40C which detects smoke, and human sensors 40A and 40B which detect a person with infrared rays are used. Particularly, in a case where the sensors are not required to be differentiated from each other, the sensors are collectively referred to as sensor 40. As will be described later, infrared sensor 313 (refer to FIG. 4) built into camera 30 is also used as a human sensor.

A plurality of cameras (specifically, indoor camera 30A, monitoring camera 30B, baby monitoring camera 30C, . . . ) have a call function and are connected to master device 10 in the DECT communication method. Herein, as cameras, monitoring camera 30B which captures an image of an outdoor environment, indoor camera 30A which captures an image of house 8, and baby monitoring camera 30C which captures an image of a sleeping location of an infant (for example, a baby bed (not illustrated) or the vicinity thereof), are used. Particularly, in a case where the cameras are not required to be differentiated from each other, the cameras are collectively referred to as camera 30.

Smartphone 50 is provided as an example of a mobile phone terminal. Smartphone 50 is connected to master device 10 via wireless router 60 using a wireless LAN, and is connected to mobile phone 70 or other smartphones via mobile phone network 75 using a communication method such as the third generation (3G) method, a high speed packet access (HSPA) method, or a long term evolution (LTE) method.

Figure 2:
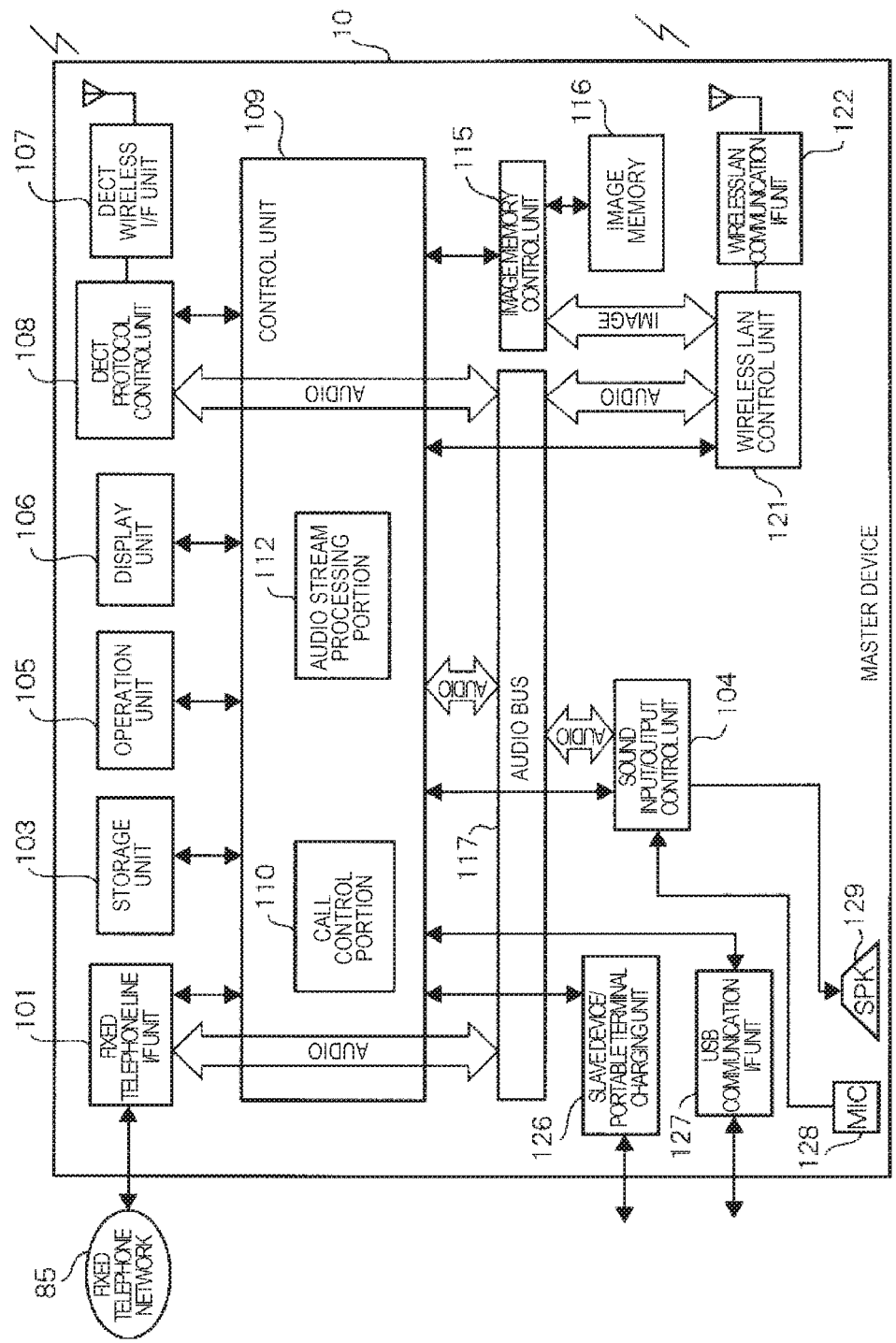
FIG. 2 is a block diagram illustrating an example of an internal configuration of a master device.

FIG. 2 is a block diagram illustrating an example of an internal configuration of master device 10. Master device 10 includes control unit 109, storage unit 103, operation unit 105, and display unit 106. Master device 10 receives various input operations and displays information such as an image on display unit 106. Control unit 109 has call control portion 110 and audio stream processing portion 112 built thereinto, and performs call control during calling, processing of audio data, and the like.

Master device 10 includes image memory control unit 115 and image memory 116, and stores image data or the like captured by camera 30 in image memory 116.

Master device 10 includes wireless LAN control unit 121 and wireless LAN communication I/F unit 122, and transmits and receives image data and audio data to and from smartphone 50, camera 30, and the like via wireless router 60 connected over a wireless LAN.

Master device 10 includes DECT protocol control unit 108 and DECT wireless I/F unit 107, and performs wireless connection to slave device 20, sensor 40, and camera 30 by using a wireless method such as digital enhanced cordless telecommunications (DECT).

Master device 10 includes audio bus 117, sound input/output control unit 104, speaker 129, and microphone 128, and performs input and output of sound to and from an external device.

Master device 10 includes fixed telephone line I/F unit 101, and can perform a call to external fixed telephone 80 (refer to FIG. 1) connected to fixed telephone network 85. It is assumed that fixed telephone 80 is designated in advance by the user as a transmission destination to which the incoming call to master device 10 is transmitted, for example, in a case where there is no person in house 8 when there is an incoming call to master device 10.

Master device 10 includes slave device/portable terminal charging unit 126 and charges slave device 20 or smartphone 50 inserted into insertion port 10*a*.

Master device 10 includes USB communication I/F unit 127, and transmits and receives data to and from an apparatus, a memory, or the like having an interface of a universal serial bus (USB) standard.

Master device 10 registers pairs of various sensors 40 and the plurality of cameras 30 in storage unit 103 in correlation with each other. For example, human sensor 40B and monitoring camera 30B are installed at close locations outdoors and are thus registered in correlation with each other. Monitoring camera 30B, as will be described later, integrally has infrared sensor 313 (refer to FIG. 4) which is a human sensor and is built thereinto, and is thus also registered in correlation with infrared sensor 313. Human sensor 40A, smoke sensor 40C, and opening/closing sensor 40D are all installed inside house 8 and are thus registered in correlation with either indoor camera 30A or baby monitoring camera 30C.

Master device 10 stores, in storage unit 103, an alarm notification destination list (refer to FIG. 11) as a notification destination list in which any one of sensors 40 is correlated with one or more notification destination devices (for example, cordless slave device 20, and fixed telephone 80) of alert notification information (refer to the following description). FIG. 11 is a diagram illustrating an example of an alert notification destination list. In FIG. 11, the name of sensor 40, identification information (ID) of sensor 40, an installation location of sensor 40, and a notification destination device of alert notification information are correlated with each other for each sensor 40. For convenience of description, an ID of sensor 40 and a reference sign used in each sensor are the same as each other.

For example, human sensor 40A1 having identification information (ID) "40A1" is installed at an entrance, and smartphone 50, cordless slave device 20, and fixed telephone 80 are registered as notification destination devices of alert notification information (which will be described later). In other words, in a case where human sensor 40A1 detects a predetermined event (for example, detection of a person), smartphone 50, cordless slave device 20, and fixed telephone 80 are notified of alert notification information via master device 10.

For example, human sensor 40A2 having identification information (ID) "40A2" is installed in a living room, and smartphone 50 and cordless slave device 20 are registered as notification destination devices of alert notification information (which will be described later). In other words, in a case where human sensor 40A2 detects a predetermined event (for example, detection of a person), smartphone 50 and cordless slave device 20 are notified of alert notification information via master device 10.

For example, human sensor 40A3 having identification information (ID) "40A3" is installed in a bedroom, and smartphone 50 is registered as a notification destination device of alert notification information (which will be described later). In other words, in a case where human sensor 40A3 detects a predetermined event (for example, detection of a person), smartphone 50 is notified of alert notification information via master device 10.

Figure 3:
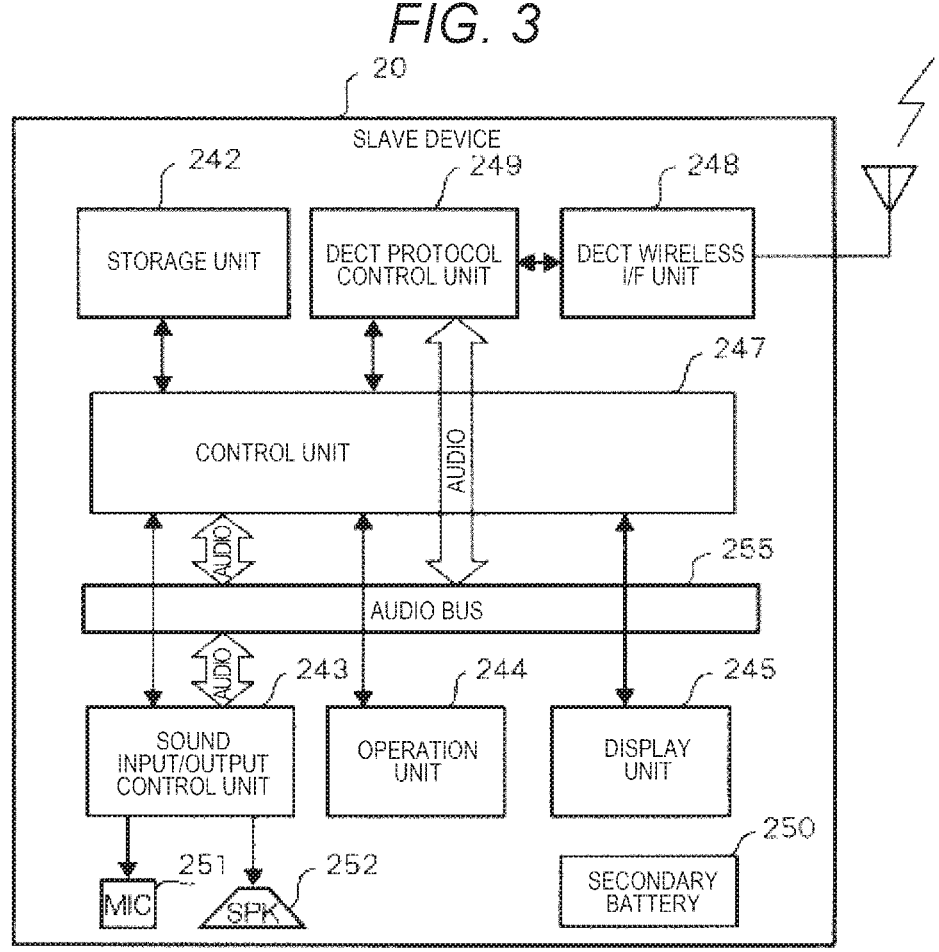
FIG. 3 is a block diagram illustrating an example of an internal configuration of a cordless slave device.

FIG. 3 is a block diagram illustrating an example of an internal configuration of (cordless) slave device 20. Slave device 20 includes control unit 247, storage unit 242, operation unit 244, and display unit 245. Slave device 20 receives various input operations and displays information such as an image on display unit 245. In a case where a notification of alert notification information is received from master device 10, slave device 20 displays the alert notification information on display unit 245.

Slave device 20 includes DECT protocol control unit 249 and DECT wireless I/F unit 248, and performs wireless connection to master device 10, sensor 40, and camera 30 by using a wireless method such as DECT.

Slave device 20 includes audio bus 255, sound input/output control unit 243, speaker 252, and microphone 251, and performs input and output of sound to and from an external device. In a case where audio data of a notification sound (event detection notification sound) indicating that a predetermined event has been detected by any one of sensors 40 is received from master device 10, slave device 20 outputs the audio data of the event detection notification sound from speaker 252 by a predetermined number of times (for example, three times). The predetermined number of times may be specified in advance in slave device 20, and may be a number of times for which an instruction is given in the audio data of the event detection notification sound from master device 10.

Slave device 20 includes secondary battery 250, and, in a case of being used as a cordless slave device, each unit of slave device 20 is supplied with power from secondary battery 250 so as to perform an operation.

Figure 4:
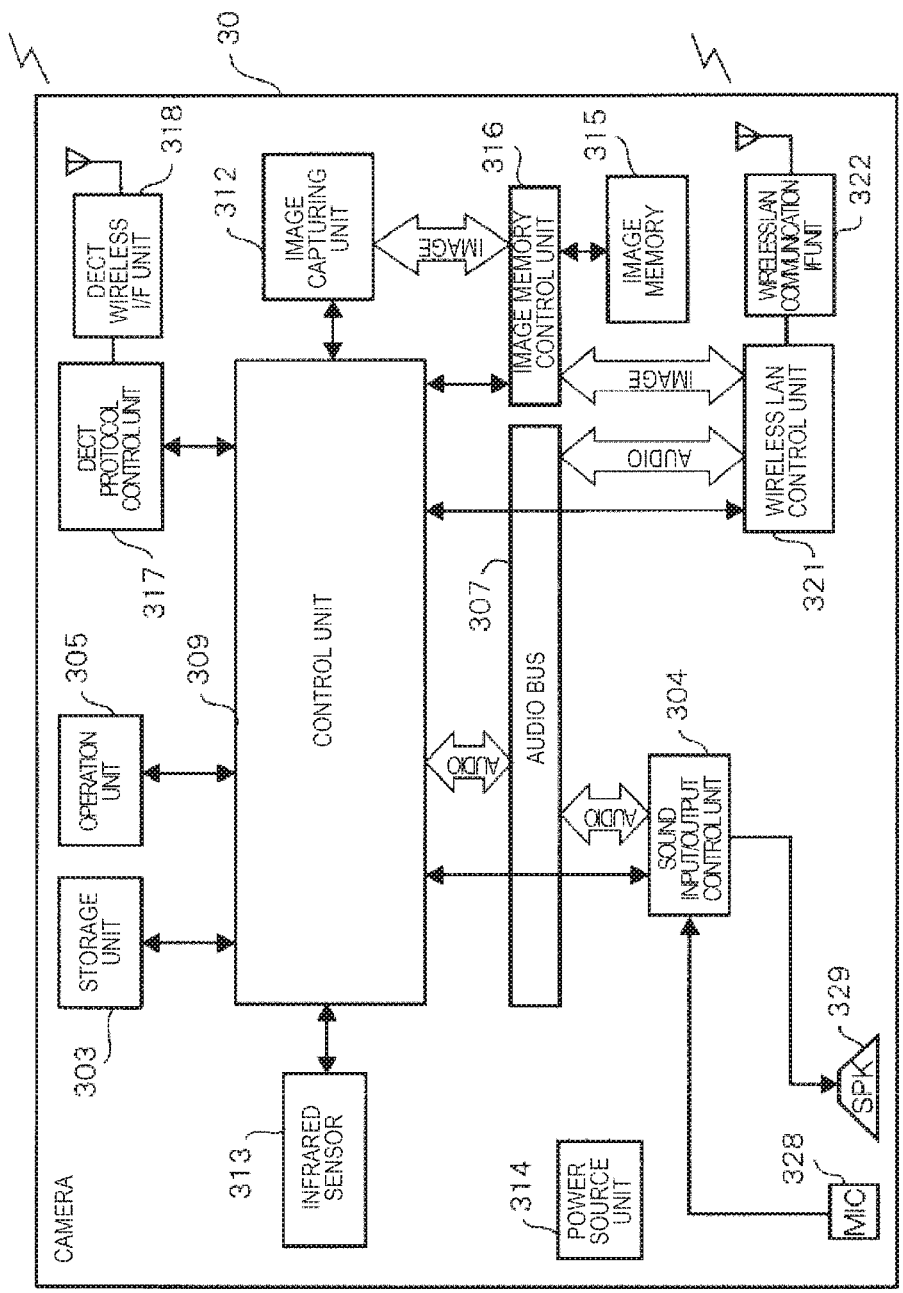
FIG. 4 is a block diagram illustrating an example of an internal configuration of a camera.

FIG. 4 is a block diagram illustrating an example of an internal configuration of camera 30. Indoor camera 30A, monitoring camera 30B, and baby monitoring camera 30C as examples of cameras 30 have substantially the same configuration as each other. Camera 30 includes control unit 309, storage unit 303, and operation unit 305. Camera 30 performs an operation related to image capturing and also receives input operations.

Camera 30 includes DECT protocol control unit 317 and DECT wireless I/F unit 318, and performs wireless connection to master device 10 by using a wireless method such as DECT.

Camera 30 includes wireless LAN control unit 321 and wireless LAN communication I/F unit 322, and transmits and receives image data and audio data to and from master device 10, smartphone 50, and the like via wireless router 60 connected over the wireless LAN.

Camera 30 includes audio bus 307, sound input/output control unit 304, speaker 329, and microphone 328, and performs input and output of sound to and from an external device. For example, camera 30 transmits audio data collected by microphone 328 to master device 10, and outputs audio data including selected audio data (for example, call voice of a user of smartphone 50) transmitted from master device 10, from speaker 329.

Camera 30 includes image capturing unit 312, image memory control unit 316, and image memory 315, and stores image data captured by image capturing unit 312 in image memory 315. Image capturing unit 312 has a known image capturing mechanism and includes at least a lens and an imaging element (for example, an image sensor such as a charged coupled device (CCD) or a complementary metal oxide semiconductor (CMOS)).

Camera 30 integrally has infrared sensor 313 which is a passive infrared (PIR) sensor as a human sensor built thereinto. Infrared sensor 313 detects the presence of a person by detecting a change in heat (infrared ray) generated by the person. Camera 30 includes a power source unit 314 which is constituted by a commercial AC power source. However, infrared sensor 313 illustrated in FIG. 4 is not provided in baby monitoring camera 30C illustrated in FIG. 1.

Figure 5:
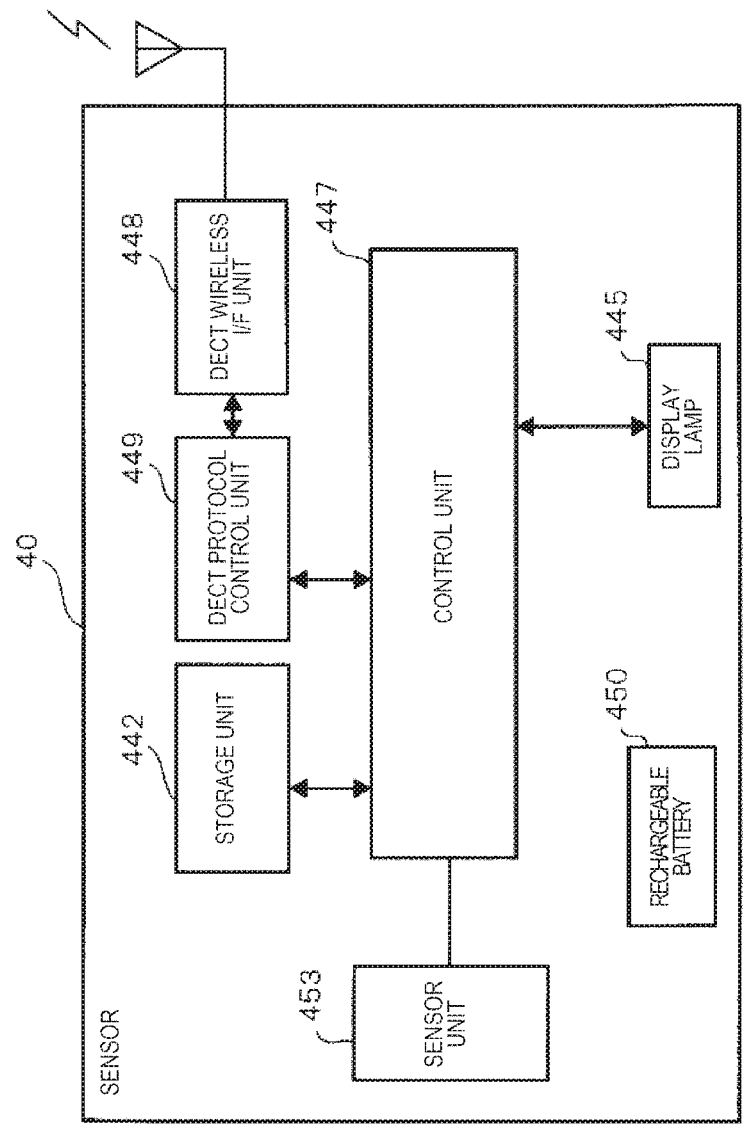
FIG. 5 is a block diagram illustrating an example of an internal configuration of a sensor.

FIG. 5 is a block diagram illustrating an example of an internal configuration of sensor 40. Sensor 40 includes control unit 447, storage unit 442, and display lamp 445. Sensor 40 performs a predetermined detection operation, such as turning on display lamp 445, in a case where a predetermined event (for example, detection of a person such as an intruder, which is also the same for the following description unless particularly otherwise description is made as description of an event) is detected.

Sensor 40 includes DECT protocol control unit 449 and DECT wireless I/F unit 448, and performs wireless connection to master device 10 by using a wireless method such as DECT, and transmits a notification (event detection notification) indicating that an event has been detected to master device 10 when the predetermined event is detected.

Sensor unit 453 differs depending on the kind of sensor 40. For example, in a case of human sensors 40A1, 40A2, 40A3 and 40B, sensor unit 453 is a PIR sensor which detects a person through a change in infrared rays. In a case of opening/closing sensor 40D which detects opening and closing of a front door, a window, or the like, sensor unit 453 is a reed switch which switches between turned-on and turned-off states due to opening and closing. In a case of smoke sensor 40C, sensor unit 453 is a light emitting/receiving unit which detects smoke when emitted light is blocked by the smoke. Secondary battery 450 is a rechargeable battery and supplies power to each unit. Sensor unit 453 may be a temperature sensor which can detect an ambient temperature.

Figure 6:
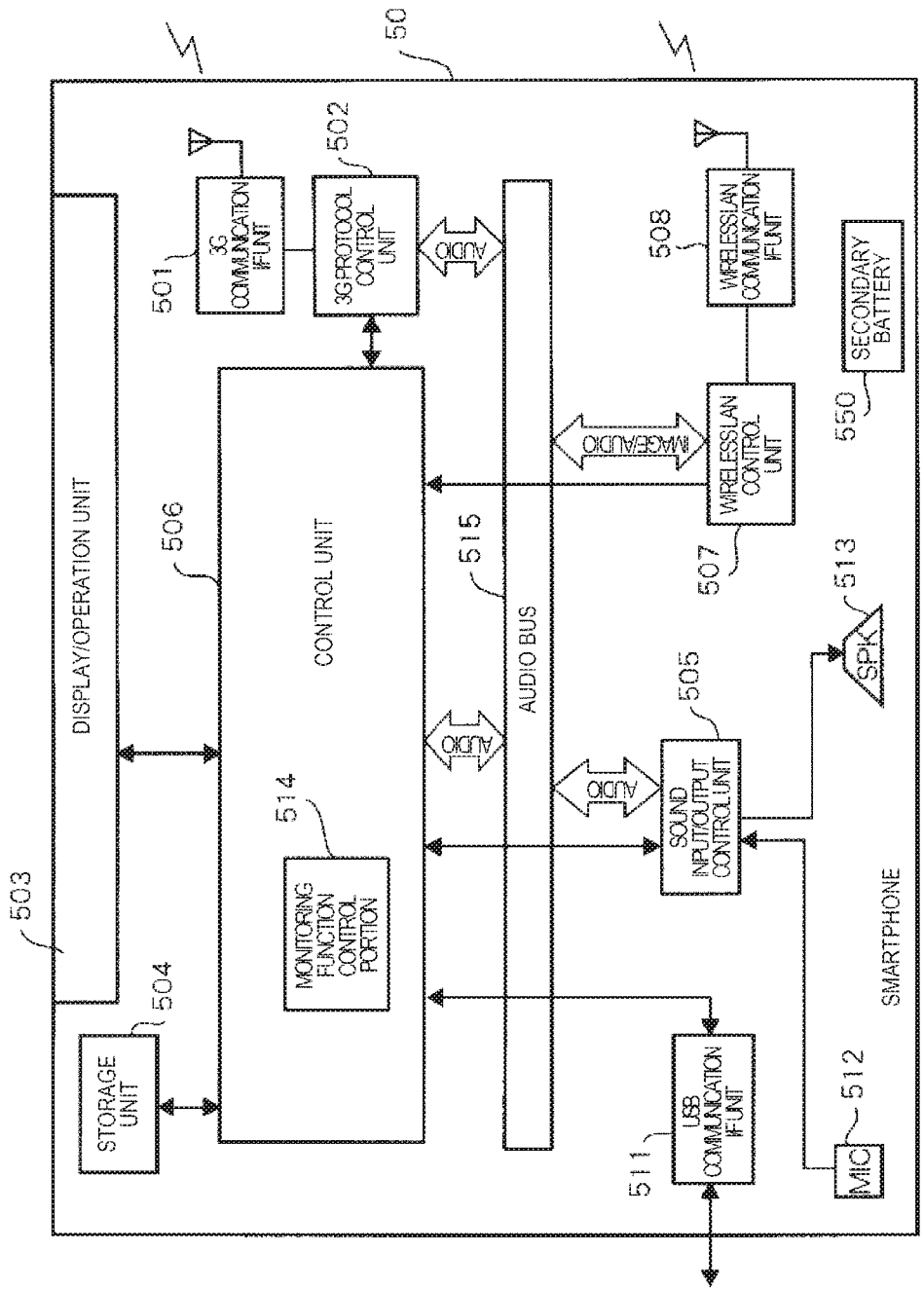
FIG. 6 is a block diagram illustrating an example of an internal configuration of a smartphone.

FIG. 6 is a block diagram illustrating an example of an internal configuration of smartphone 50. Smartphone 50 as a mobile phone terminal includes control unit 506, storage unit 504, and display/operation unit (for example, touch panel) 503. Smartphone 50 receives various input operations and displays information such as an image or alert notification information (for example, refer to FIG. 10B or FIG. 10C) on display/operation unit 503. A monitoring function control portion 514 which can set a function of camera 30 is built into control unit 506 as described later.

Display/operation unit 503, which is a display/input unit into which a display unit and an operation unit are integrated, displays information such as an image or an icon on a screen, and receives a tap operation (or a touch operation) on a screen performed by a user.

A client application corresponding to house monitoring system 5 of the present embodiment is installed in smartphone 50, and a program and data of the client application are stored in storage unit 504. Smartphone 50 reads and activates the client application from storage unit 504 through a user's input operation.

Smartphone 50 includes 3G protocol control unit 502 and 3G wireless I/F unit 501, and performs wireless connection to mobile phone 70 or other smartphones connected to mobile phone network 75, by using a third generation (3G) wireless communication method. Smartphone 50 may include a protocol control unit and a wireless I/F unit corresponding to a wireless communication method (for example, HSPA or LTE) other than the 3G method.

Smartphone 50 includes audio bus 515, sound input/output control unit 505, speaker 513, and microphone 512, and performs input and output of sound to and from an external device. For example, smartphone 50 transmits audio data of a user collected by microphone 512 to master device 10, receives audio data of a call party collected by camera 30 (for example, baby monitoring camera 30C) from master device 10, and outputs the audio data transmitted from master device 10, from speaker 329. Consequently, in house monitoring system 5 of the present embodiment, bidirectional communication can be performed between smartphone 50 and camera 30 (for example, baby monitoring camera 30C) via master device 10.

Smartphone 50 includes wireless LAN control unit 507 and wireless LAN communication I/F unit 508, and transmits and receives image data and audio data to and from master device 10 or camera 30 via wireless router 60 connected over the wireless LAN.

Smartphone 50 includes USB communication I/F unit 511, and transmits and receives data to and from an apparatus, a memory, or the like having an interface of a universal serial bus (USB) standard.

Next, with reference to FIG. 7, a description will be made of an operation of house monitoring system 5 of the present embodiment. FIG. 7 is a sequence diagram illustrating an example of an operation procedure in which master device 10 transmits and displays an image which is being recorded by baby monitoring camera 30C to smartphone 50 in house monitoring system 5 of the present embodiment. In FIG. 7, for convenience of description, baby monitoring camera 30C is used as an example of camera 30, but other cameras 30 may be used.

In FIG. 7, it is assumed that a home security application corresponding to house monitoring system 5 of the present embodiment is activated in smartphone 50 in advance.

In FIG. 7, if detection information (for example, information regarding an activation operation of the client application for home security, corresponding to house monitoring system 5, performed by the user operating smartphone 50) for a predetermined trigger operation is acquired (step S1), master device 10 performs a wireless communication connection to smartphone 50 by using a wireless LAN (step S2), and transmits the detection information (refer to the above description) for the predetermined trigger operation to smartphone 50 when the wireless LAN connection to smartphone 50 has been completed (step S3).

If an instruction operation of an image/audio data transmission request is received from the user (step S4), smartphone 50 transmits information regarding the instruction operation of an image/audio data transmission request (step S5). If the information regarding the instruction operation is received from smartphone 50, master device 10 requests baby monitoring camera 30C to transmit image/audio data (step S6). Master device 10 may transmit the detection information (refer to the above description) for the predetermined trigger operation to smartphone 50 and may also request baby monitoring camera 30C to transmit image/audio data (step S6).

If the image/audio data transmission request is received from master device 10, baby monitoring camera 30C performs a wireless communication connection to master device 10 by using the wireless LAN, and acquires image data captured by image capturing unit 312 and audio data collected by microphone 328 and transmits the data to master device 10 (step S7). Master device 10 transmits the image data and the audio data transmitted from baby monitoring camera 30C to smartphone 50 (step S8). Smartphone 50 displays the image data transmitted from master device 10 on display/operation unit 503, and outputs the audio data transmitted from master device 10 from speaker 513. Consequently, smartphone 50 can display a live monitoring screen illustrated in FIG. 10A (step S9).

Next, a description will be made of examples of various screens displayed on smartphone 50 with reference to FIGS. 8A to 8C, 9A and 9B, and 10A to 10C. A home screen illustrated in FIG. 8A is the same as a home screen illustrated in FIG. 9A, and thus description thereof will not be repeated.

First, with reference to FIG. 8A, a description will be made of a home screen of the client application activated in smartphone 50. FIG. 8A is a diagram illustrating an example of a home screen displayed on smartphone 50 in which the client application of house monitoring system 5 is installed.

Figure 8C:
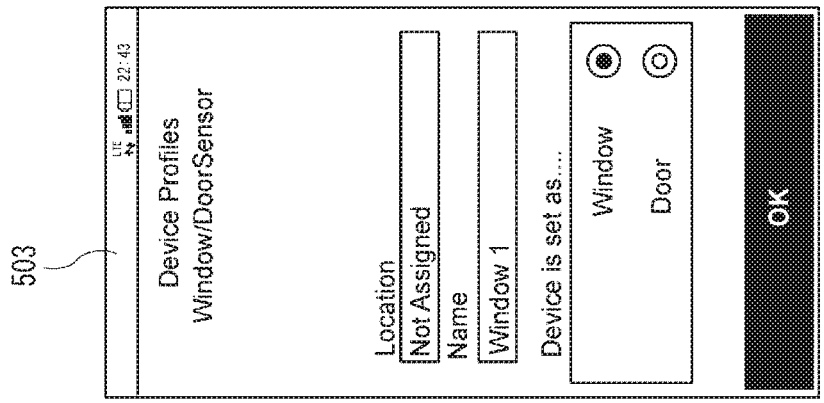
FIG. 8C is a diagram illustrating an example of a specific screen of device profiles (Device Profiles) illustrated in FIG. 8B.
Figure 8B:
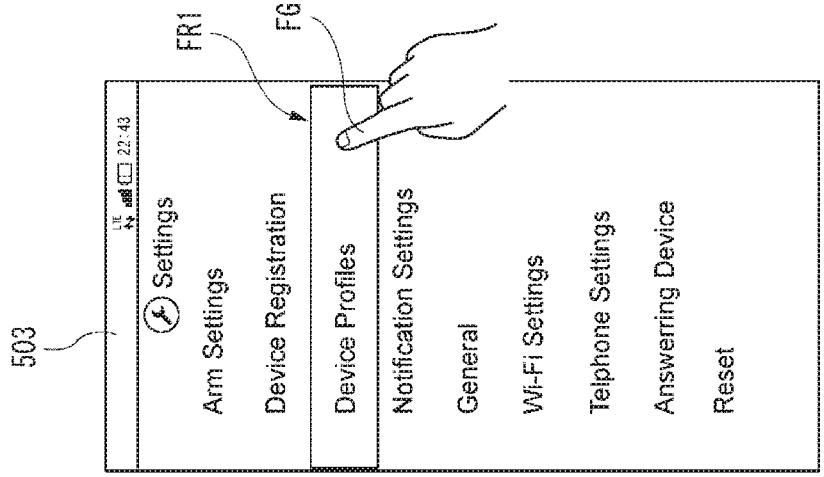
FIG. 8B is a diagram illustrating an example of a specific screen of settings (Settings) of the home screen illustrated in FIG. 8A.
Figure 8A:
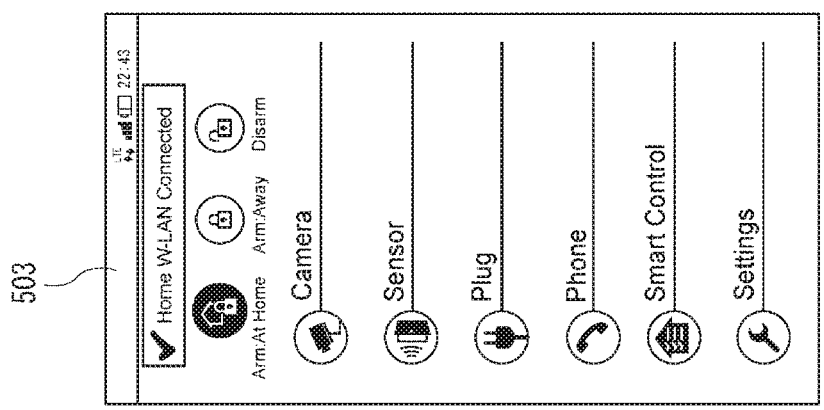
FIG. 8A is a diagram illustrating an example of a home screen displayed on the smartphone in which a client application of the house monitoring system is installed.

In the home screen illustrated in FIG. 8A, icons respectively indicating a camera (Camera), a sensor (Sensor), a smart plug (Plug), a smartphone (Phone), home control (Smart Control), and settings (Settings) are displayed on display/operation unit 503 of smartphone 50. If the user performs a tap operation on the icon indicating the settings (Settings) with a finger FG, smartphone 50 displays a specific screen of the settings (Settings), illustrated in FIG. 8B, on display/operation unit 503. FIG. 8B is a diagram illustrating an example of the specific screen of the settings (Settings) of the home screen illustrated in FIG. 8A. Setting menus regarding a plurality of items are displayed on the specific screen of the settings (Settings) illustrated in FIG. 8B.

For example, if the user performs a tap operation on the setting menu of device profiles (Device Profiles) with finger FG among the setting menus, smartphone 50 displays a specific screen of the device profiles (Device Profiles), illustrated in FIG. 8C, on display/operation unit 503. A frame FR1 indicating that the tap operation is performed is instantaneously displayed in the device profiles (Device Profiles) which is a setting menu which is tapped with finger FG. FIG. 8C is a diagram illustrating an example of a specific screen of the device profiles (Device Profiles) illustrated in FIG. 8B. Herein, for convenience of description, it is assumed that the screen illustrated in FIG. 8C is displayed in a case where sensor 40 is designated as a device.

An input reception region of an installation location (Location) of a device (that is, sensor 40), an input reception region of a name (Name) of sensor 40, and a selection indication region indicating whether sensor 40 is a "window opening and closing sensor" or a "door opening and closing sensor", are displayed on the specific screen of device profiles (Device Profiles) illustrated in FIG. 8C. In FIG. 8C, in a case where none is input to the input reception region of an installation location of sensor 40, "Not Assigned" is displayed. In a case where sensor 40 is selected as a "window opening and closing sensor", a temporary name such as "Window 1" is displayed in the input reception region of the name (Name) of sensor 40. The installation location (Location) or the name (Name) of sensor 40 can be changed as appropriate through an input operation using finger FG of the user.

For example, in a case where appropriate installation location and name are input to the installation location (Location) or the name (Name) of sensor 40, either "Window (window)" or "Door (entrance)" is selected as a type of sensor 40, and an OK button is tapped, smartphone 50 completes setting of profiles of a device (sensor 40) through an operation using finger FG of the user. Such device profiles are preferably set in advance before an operation (refer to FIG. 12) of house monitoring system 5 of the present embodiment is performed.

Figure 9B:
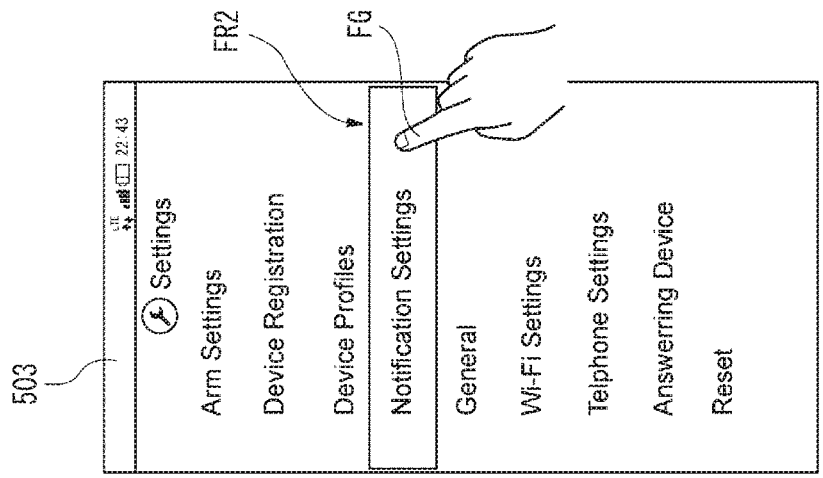
FIG. 9B is a diagram illustrating an example of a specific screen of settings (Settings) of the home screen illustrated in FIG. 9A.
Figure 9A:
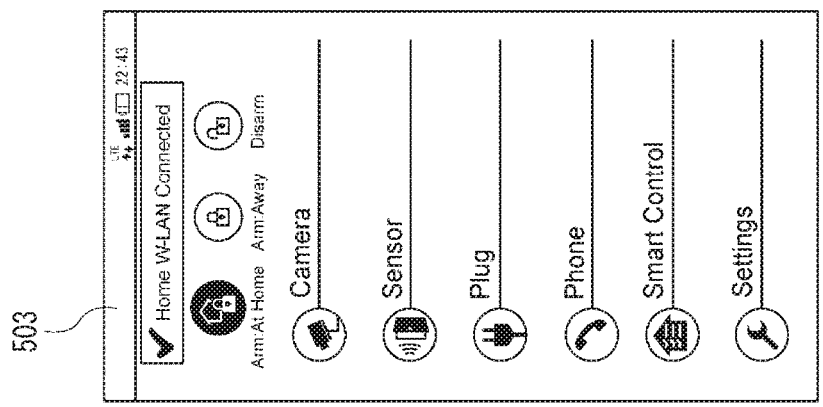
FIG. 9A is a diagram illustrating an example of a home screen displayed on the smartphone in which a client application of the house monitoring system is installed.

Next, a description will be made of setting of a notification destination device of alert notification information with reference to FIGS. 9A and 9B. FIG. 9A is a diagram illustrating an example of a home screen displayed on smartphone 50 in which the client application of house monitoring system 5 is installed. FIG. 9B is a diagram illustrating an example of a specific screen of settings (Settings) of the home screen illustrated in FIG. 9A.

For example, if the user performs a tap operation on the setting menu of notification destination device settings (Notification Settings) with finger FG among the setting menus (refer to FIG. 9B), smartphone 50 displays a setting screen (not illustrated) for setting a notification destination device of alert notification information for each sensor 40, on display/operation unit 503. A frame FR2 indicating that the tap operation is performed is instantaneously displayed in the notification destination device settings (Notification Settings) which is a setting menu which is tapped with finger FG. A notification destination device which is a notification destination of alert information is set for each sensor 40 through setting using the setting screen (refer to FIG. 11).

Figure 10C:
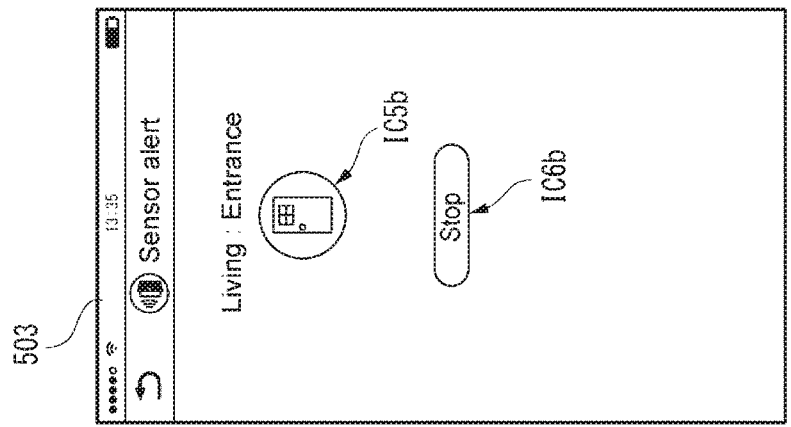
FIG. 10C is a diagram illustrating a second example of alert notification information which is displayed on the live monitoring screen illustrated in FIG. 10A in an interruption manner.
Figure 10B:
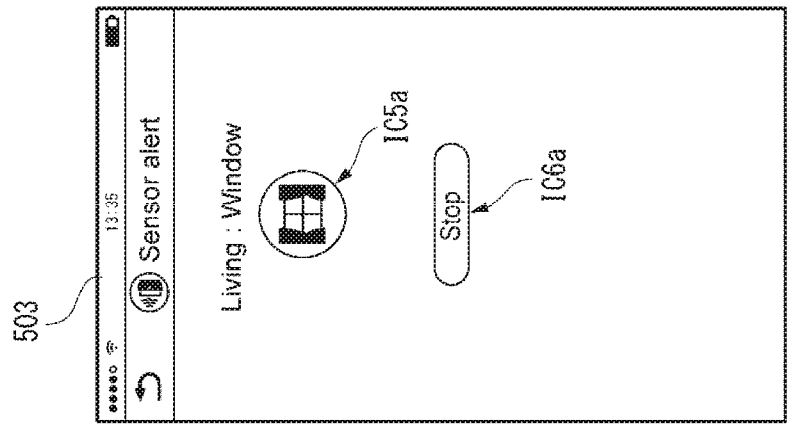
FIG. 10B is a diagram illustrating a first example of alert notification information which is displayed on the live monitoring screen illustrated in FIG. 10A in an interruption manner.
Figure 10A:
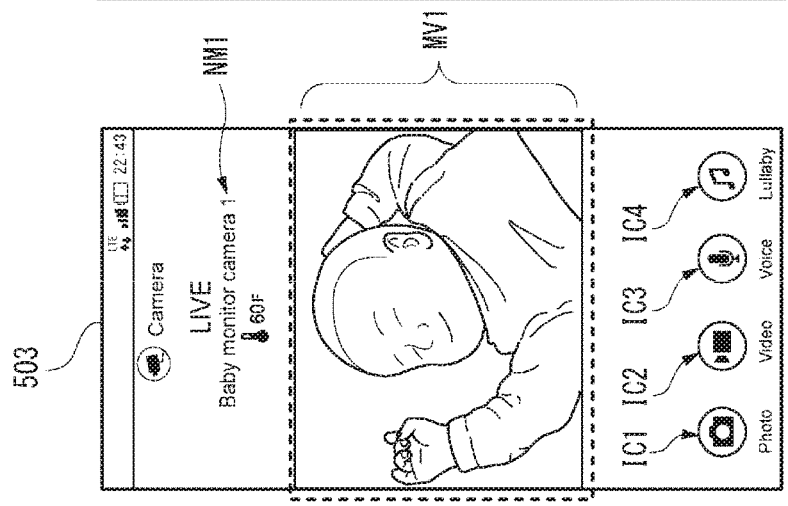
FIG. 10A is a diagram illustrating an example of a live monitoring screen displayed on the smartphone while a baby monitoring camera performs recording.

Next, with reference to FIG. 10A, a description will be made of a live monitoring screen on which real-time image data captured by camera 30 (for example, baby monitoring camera 30C) is displayed in smartphone 50. FIG. 10A is a diagram illustrating an example of a live monitoring screen displayed on smartphone 50 during recording performed by baby monitoring camera 30C.

Display/operation unit 503 of smartphone 50 illustrated in FIG. 10A displays real-time image (or a video) MV1 recorded by baby monitoring camera 30C, and also displays the name NM1 (for example, baby monitoring camera 30C) of camera 30 which is mainly used to capture an image. Display/operation unit 503 of smartphone 50 may also display information regarding a temperature detected by sensor 40 which forms a pair with camera 30 which is mainly used to capture an image. Display/operation unit 503 of smartphone 50 displays Photo icon IC1, Video icon IC2, Voice icon IC3, and Lullaby icon IC4 so as to be selectable.

Photo icon IC1, Video icon IC2, Voice icon IC3, and Lullaby icon IC4 are respectively menu icons which are disposed in advance in order to perform various settings corresponding to a still image (Photo), a moving image (Video), sound (Voice such as call voice), and sound source (Lullaby). For example, Photo icon IC1 is an icon which is used to give an instruction for starting recording in camera 30 and to set a function of an image recorded by camera 30. Video icon IC2 is an icon which is used to give an instruction for starting recording in camera 30 and to set a function of an image recorded by camera 30. Voice icon IC3 is an icon which is used to give an instruction for starting bidirectional calls to camera 30 and to set a function of bidirectional calls to camera 30.

In a case where camera 30 (for example, baby monitoring camera 30C) does not output (reproduce) audio data of a lullaby sound source, when Lullaby icon IC4 is tapped, smartphone 50 displays a lullaby sound source selection screen (not illustrated) on display/operation unit 503 and receives a selection operation of one lullaby sound source from the user.

Next, a description will be made of a specific example of alert notification information which is displayed on the live monitoring screen illustrated in FIG. 10A in an interruption manner, with reference to FIGS. 10B and 10C. FIG. 10B is a diagram illustrating a first example of alert notification information which is displayed on the live monitoring screen illustrated in FIG. 10A in an interruption manner. FIG. 10C is a diagram illustrating a second example of alert notification information which is displayed on the live monitoring screen illustrated in FIG. 10A in an interruption manner.

FIG. 10B illustrates an example in which sensor 40 whose type is selected as "Window (window)" in FIG. 8C detects a predetermined event (for example, opening or closing of a window), alert notification information is displayed on display/operation unit 503 of smartphone 50. A sensor icon IC5a in which a corresponding sensor 40 (that is, a sensor whose type is selected as "Window (window)") can be visually recognized by the user, and stop icon IC6a for stopping the display of the alert notification information illustrated in FIG. 10B, are displayed on the screen example of the alert notification information illustrated in FIG. 10B. An installation location and a name of the corresponding sensor 40 are displayed as text on the upper part of sensor icon IC5a. In a case where a tap operation is performed on stop icon IC6a, smartphone 50 displays the live monitoring screen (refer to FIG. 10A) which is displayed right before the alert notification information illustrated in FIG. 10B is displayed, in an interruption manner on display/operation unit 503.

Figure 12:
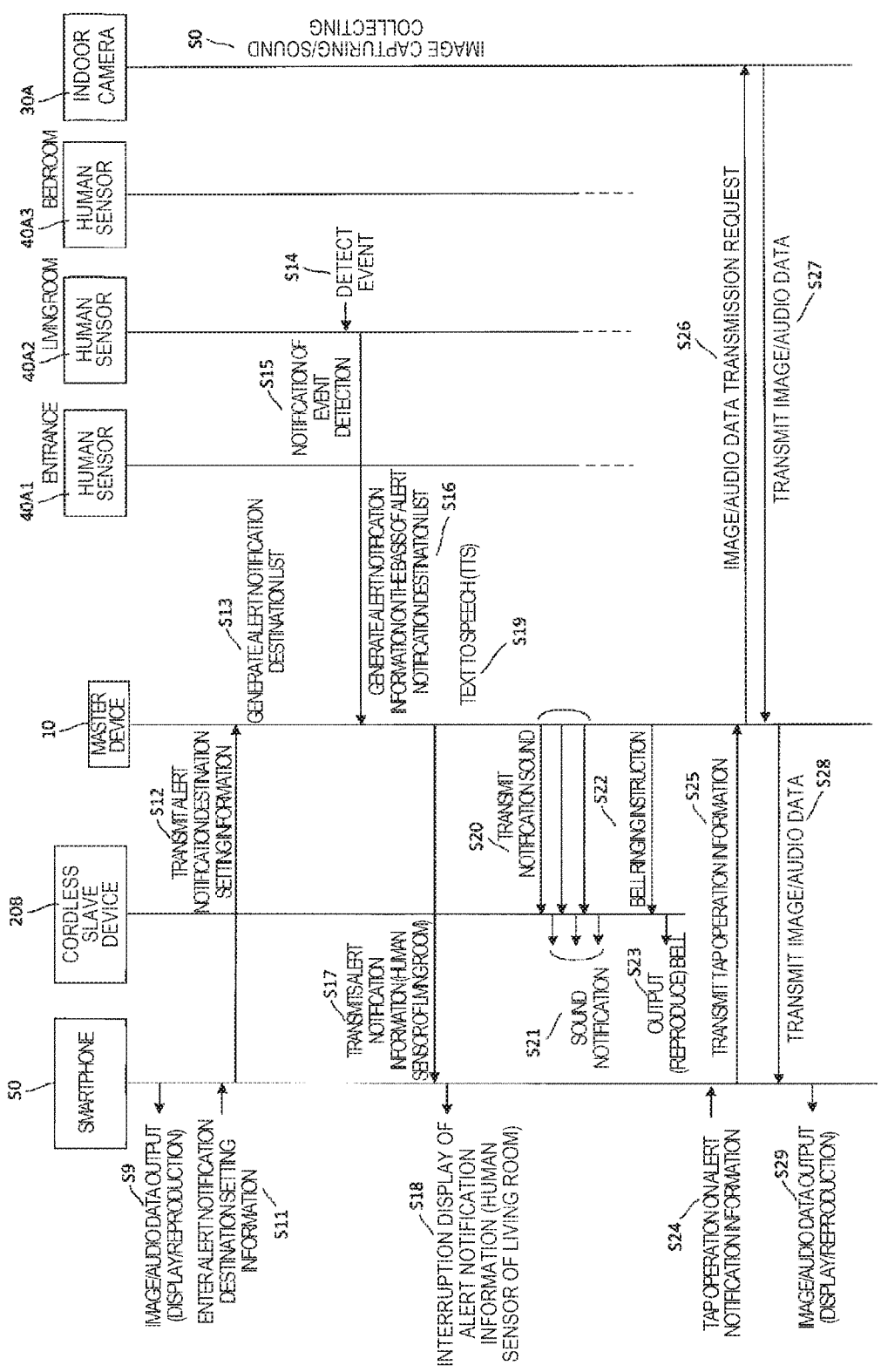
FIG. 12 is a sequence diagram illustrating an example of an operation procedure in which alert notification information is displayed on the smartphone in an interruption manner via the master device in the house monitoring system of the present embodiment.

In a case where a tap operation is performed on sensor icon IC5a by using finger FG of the user, smartphone 50 requests master device 10 to transmit image data captured and audio data collected by camera 30 (for example, indoor camera 30A) which is correlated so as to form a pair with sensor 40 corresponding to sensor icon IC5a (refer to FIG. 12).

Similarly, FIG. 10C illustrates an example in which sensor 40 whose type is selected as "Door (entrance)" in FIG. 8C detects a predetermined event (for example, opening or closing of an entrance), alert notification information is displayed on display/operation unit 503 of smartphone 50. A sensor icon IC5b in which a corresponding sensor 40 (that is, a sensor whose type is selected as "Door (entrance)") can be visually recognized by the user, and a stop icon IC6b for stopping the display of the alert notification information illustrated in FIG. 10C, are displayed on the screen example of the alert notification information illustrated in FIG. 10C. An installation location and a name of the corresponding sensor 40 are displayed as text on the upper part of sensor icon IC5b. In a case where a tap operation is performed on stop icon IC6b, smartphone 50 displays the live monitoring screen (refer to FIG. 10A) which is displayed right before the alert notification information illustrated in FIG. 10C is displayed, in an interruption manner on display/operation unit 503.

In a case where a tap operation is performed on sensor icon IC5b by using finger FG of the user, smartphone 50 requests master device 10 to transmit image data captured and audio data collected by camera 30 (for example, monitoring camera 30B) which is correlated so as to form a pair with sensor 40 corresponding to sensor icon IC5b (refer to FIG. 12).

Next, with reference to FIG. 12, a description will be made of setting of an alert notification destination list, and interruption display of alert notification information in a case where sensor 40 detects a predetermined event, in house monitoring system 5 of the present embodiment. FIG. 12 is a sequence diagram illustrating an example of an operation procedure in which alert notification information is displayed on smartphone 50 in an interruption manner via master device 10 in house monitoring system 5 of the present embodiment. As the premise of description of FIG. 12, indoor camera 30A captures an image in an image capturing range of indoor camera 30A and collects sound in the image capturing range (step S0).

In FIG. 12, the description will be made by using human sensor 40A1 provided at the entrance, human sensor 40A2 provided at the living room, and human sensor 40A3 provided at the bed room as examples of a plurality of sensors 40 in house 8.

In FIG. 12, if the user performs an operation (for example, a tap operation on the setting menu of "Notification Settings" illustrated in FIG. 9B) of giving an instruction for setting a notification destination device of alert notification information in a state (step S9) in which the live monitoring screen illustrated in FIG. 10A is displayed on display/operation unit 503 of smartphone 50, smartphone 50 displays a setting screen (not illustrated) of a notification destination device of alert information on display/operation unit 503. If the user enters setting information of a notification destination device of alert notification information to the setting screen displayed on smartphone 50 for each sensor 40 (step S11), smartphone 50 transmits the setting information of a notification destination device of alert notification information to master device 10 (step S12).

If the setting information of a notification destination device of alert notification information is received from smartphone 50, master device 10 generates an alert notification destination list illustrated in FIG. 11 for each sensor 40 (step S13).

Here, if human sensor 40A2 provided at the living room detects a predetermined event (for example, the presence of a person such as an intruder) (step S14), human sensor 40A2 transmits an event detection notification to master device 10 in the DECT method (step S15).

If the event detection notification is received from human sensor 40A2, master device 10 generates alert notification information for informing the user of the fact that the event has been detected by human sensor 40A2 (step S16). Master device 10 transmits the alert notification information generated in step S16 to smartphone 50 of the notification destination devices (that is, smartphone 50 and cordless slave device 20) corresponding to human sensor 40A2 on the basis of the alert notification destination list (refer to FIG. 11) generated in step S13 (step S17).

Smartphone 50 displays the alert notification information transmitted from the master device 10 on display/operation unit 503 in an interruption manner (step S18). In other words, image data transmitted from any one of cameras 30 via master device 10 is displayed on display/operation unit 503 as the live monitoring screen in step S9, but the alert notification information (refer to FIG. 10B or FIG. 10C) is displayed preferentially to the image data from any one of cameras 30. Consequently, the user can easily check the fact that any one of sensors 40 has detected a predetermined event on display/operation unit 503 of smartphone 50.

After step S16, master device 10 performs a text to speech (TTS) process which is a well-known technique, and thus generates a notification sound (alert notification sound) corresponding to text (for example, "the human sensor of the living room has detected") of content indicated by the alert notification information generated in step S16 (step S19). Master device 10 transmits the alert notification sound generated in step S19 to cordless slave device 20 of the notification destination devices (that is, smartphone 50 and cordless slave device 20) corresponding to human sensor 40A2 by a predetermined number of times (for example, three times) on the basis of the alert notification destination list (refer to FIG. 11) generated in step S13 (step S20). After step S20, master device 10 transmits an instruction for bell ringing indicating an end of transmission of the alert notification sound to cordless slave device 20 (step S22).

Cordless slave device 20 outputs the alert notification sound transmitted from master device 10 by a predetermined number of times from speaker 252 (step S21), and outputs a predetermined bell sound from speaker 252 in response to the instruction for bell ringing transmitted from master device 10 in step S22 after step S21 (step S23).

If the alert notification information displayed on display/operation unit 503 of smartphone 50 is tapped with finger FG of the user (step S24), smartphone 50 transmits operation information indicating that the alert notification information is tapped to master device 10 (step S25).

If the operation information is received from smartphone 50, master device 10 transmits a transmission request of image data and audio data to camera 30 (for example, indoor camera 30A) which is correlated so as to form a pair with sensor 40 (that is, human sensor 40A2 provided at the living room in FIG. 12) indicated by the alert notification information (step S26). Indoor camera 30A transmits audio data collected by microphone 328 and image data obtained by image capturing unit 312 to master device 10 in response to the transmission request from master device 10 (step S27). Master device 10 transmits the image data and the audio data transmitted from indoor camera 30A to smartphone 50 (step S28). If the image data and the audio data transmitted from master device 10 is received, smartphone 50 displays the image data on display/operation unit 503 and outputs the audio data from speaker 513 (step S29).

As mentioned above, in house monitoring system 5 of the present embodiment, if at least one of sensors 40 (for example, human sensors 40A and 40B, smoke sensor 40C, and opening/closing sensor 40D) detects a predetermined event (for example, person detection, smoke detection, and window opening/closing detection), master device 10 which can communicate with at least one sensor 40 transmits information (for example, alert notification information) regarding sensor 40 which has detected the predetermined event to smartphone 50. Smartphone 50 displays the information (for example, alert notification information) regarding sensor 40 which has detected the predetermined event transmitted from master device 10 on display/operation unit 503.

Consequently, house monitoring system 5 realizes highly accurate monitoring of circumstances of house 8 at low cost by notifying smartphone 50 of an installation location of sensor 40 provided in house 8 even if a user of smartphone 50 does not know the installation location, by using master device 10 which is an existing fixed telephone connected to fixed telephone network 85 and can perform calls to another fixed telephone 80. In other words, in a security system of a house having a plurality of sensors 40, a user (for example, a dweller) can rapidly understand which sensor 40 has performed detection. Consequently, the user can instantly move to the installation location of sensor 40 having performed detection and can take an appropriate action such as checking the spot, or the user may be made to be away from the installation location of sensor 40 having performed detection. In this case, the user can avoid a danger or the like given from an intruder of house 8.

In house monitoring system 5 of the present embodiment, one or more notification destination devices (for example, cordless slave device 20 and fixed telephone 80) which can perform a call to master device 10 are provided. Master device 10 stores an alert notification destination list in which sensor 40 is correlated with one or more notification destination devices in storage unit 103, and transmits an event detection notification sound (alert notification sound) indicating that a predetermined event has been detected to the one or more notification destination devices corresponding to sensor 40 by a predetermined number of times. Cordless slave device 20 or fixed telephone 80 which is a notification destination device outputs the event detection notification sound (alert notification sound) transmitted from master device 10 by the predetermined number of times.

Consequently, in a case where the user does not carry smartphone 50 although the user does not stay in house 8, the user can rapidly understand which sensor 40 has performed detection with cordless slave device 20 disposed near the user, or even in a case where the user is out, leaving smartphone 50 in house 8, the user can rapidly understand which sensor 40 has performed detection with fixed telephone 80 which is designated in advance as a transmission destination.

In house monitoring system 5 of the present embodiment, at least one camera 30 (for example, indoor camera 30A, monitoring camera 30B, and baby monitoring camera 30C) having an image capturing unit is further provided. Camera 30 transmits image data obtained by image capturing unit 312 to master device 10, and master device 10 transmits the image data transmitted from camera 30 to smartphone 50 in response to an operation (that is, an operation of requesting transmission of the image data) on display/operation unit 503 of smartphone 50. Smartphone 50 displays the image data transmitted from master device 10 on display/operation unit 503. If sensor 40 detects a predetermined event, master device 10 transmits an interruption display instruction of information regarding sensor 40 which has detected the predetermined event to smartphone 50. Smartphone 50 preferentially displays the information regarding sensor 40 which has detected the predetermined event on display/operation unit 503 in response to the interruption display instruction transmitted from master device 10.

Consequently, in house monitoring system 5, in a case where any one of sensors 40 performs detection in house 8 while viewing image data captured by camera 30 is viewed on smartphone 50, alert notification information including information regarding sensor 40 having performed detection in house 8 can be displayed on smartphone 50 preferentially to the image data. Therefore, the user can immediately understand the occurrence of a certain event in house 8 by displaying information regarding sensor 40 having performed detection in house 8 on smartphone 50 preferentially to the image data which is previously displayed.

In house monitoring system 5 of the present embodiment, in response to an operation (that is, a tap operation on sensor icon IC5a or sensor icon IC5b) on information (alert notification information) regarding sensor 40 displayed on display/operation unit 503, master device 10 requests any one of cameras 30 (for example, indoor camera 30A) correlated with sensor 40, which is a target of the operation, to transmit image data. Camera 30 (for example, indoor camera 30A) transmits image data obtained by image capturing unit 312 to master device 10 in response to the image data transmission request from master device 10, and master device 10 transmits the image data transmitted from camera 30 to smartphone 50. Smartphone 50 changes the information regarding sensor 40 which has detected a predetermined event, and displays the image data transmitted from master device 10 on display/operation unit 503.

Consequently, in house monitoring system 5, even if a user does not stay in house 8, a simple input operation is performed on smartphone 50 in relation to information regarding sensor 40 having performed detection in house 8, and thus display of a screen is switched to image data captured by camera 30 (for example, indoor camera 30A) correlated with sensor 40 having performed detection in house 8 and is displayed on smartphone 50. Therefore, the user can rapidly check circumstances of house 8.

Although the various embodiments have been described with reference to the drawings, needless to say, the present invention is not limited to such embodiments. It is obvious that a person skilled in the art can conceive of various modifications or alterations within the scope recited in the claims, and thus it is understood that they naturally fall within the technical scope of the present invention.

In addition, in FIG. 12, a description has been made of an example in which human sensor 40A2 provided at the living room detects a predetermined event, but, for example, in a case where human sensor 40A1 provided at the entrance detects a predetermined event, master device 10 may transmit alert notification sound not only to cordless slave device 20 but also to fixed telephone 80 which is a transmission destination telephone by a predetermined number of times (for example, three times) and may cause fixed telephone 80 to output the alert notification sound.

What is claimed is:

1. A home monitoring system comprising:
   at least one sensor coupled to a communicator and configured to detect a defined event;
   a camera associated with the at least one sensor; and
   a master device that, in operation, performs wireless communication with the at last one sensor and the camera according to a communications protocol,
   wherein the master device, when transmitting first image data, via a wireless LAN router, to a smartphone to display the first image data on the smartphone,
     in response to receiving a detection signal from the at least one sensor having detected the defined event, interrupts the display of the first image data on the smartphone by transmitting a first icon representative of the at least one sensor to the smartphone to display the first icon on the smartphone in place of the first image data, and
     in response to user selection of the first icon on the smartphone, receives and forwards second image data captured by the camera associated with the at least one sensor to the smartphone to display the second image data on the smartphone in place of the first image data,
   wherein the smartphone is connectable to a mobile phone network to communicate with other mobile telephones.

2. The home monitoring system of claim 1, wherein the first icon representative of the at least one sensor is associated with a display of a location of the at least one sensor.

3. The home monitoring system of claim 1, wherein the first icon representative of the at least one sensor is associated with a display of a name of the at least one sensor.

4. The home monitoring system of claim 1, wherein the first icon representative of the at least one sensor is associated with a display of text.

5. The home monitoring system of claim 1, which comprises at least one notification destination device communicable with the master device,
   wherein the master device includes a storage configured to store a notification destination list, in which the at least one sensor is correlated with the at least one notification destination device,
   the master device, in operation, transmits an event detection notification audio indicative of that the at least one sensor has detected the defined event, a defined number of times, to the at least one notification destination device that is correlated with the at least one sensor having detected the defined event, and
   the at least one notification destination device outputs the event detection notification audio the defined number of times.

6. The home monitoring system of claim 5, wherein the at least one notification destination device is a cordless handset.

7. The home monitoring system of claim 1, wherein the at least one sensor is an infrared sensor.

8. The home monitoring system of claim 1, wherein the at least one sensor is selected from a group consisting of a human sensor, a smoke sensor, an opening/closing sensor, a temperature sensor, and a smart plug.

9. The home monitoring system of claim 1, wherein the at least one sensor is an opening/closing sensor coupled to a window or door, the defined event is opening of the window or door, and the first icon representative of the at least one sensor displayed on the smartphone is associated with a display of a name or location of the opened window or door as detected by the opening/closing sensor.

10. The home monitoring system of claim 1, wherein the at least one sensor is a smoke sensor, the defined event is detection of smoke, and the first icon representative of the at least one sensor displayed on the smartphone is associated with a display of a name or location of the smoke sensor.

11. The home monitoring system of claim 1, which comprises a plurality of sensors configured to defect a plurality of defined events, respectively, and to communicate with the master device according to the communication protocol,
    wherein the master device, when receiving a plurality of detection signals from the plurality of sensors having detected the plurality of defined events, respectively, transmits plural first icons respectively representative of the plurality of sensors, via the wireless LAN router, to the smartphone to display the plural first icons on the smartphone.

12. The home monitoring system of claim 1, wherein the master device, in response to receiving the detection signal, transmits a stop icon to the smartphone to display the stop icon adjacent to the first icon on the smartphone, and in response to user selection of the stop icon on the smartphone, switches the display of the first icon and the stop icon to the display of the first image data on the smartphone.

13. A home monitoring method based on a home monitoring system, the home monitoring system comprising: (a) at least one sensor coupled to a communicator and configured to detect a defined event; (b) a camera associated with the at least one sensor; and (c) a master device that, in operation, performs wireless communication with the at last one sensor and the camera according to a communications protocol, the home monitoring method comprising:
    transmitting first image data, from the master device, via a wireless LAN router, to a smartphone to display the first image data on the smartphone,
    receiving, at the master device, a detection signal from the at least one sensor having detected the defined event,
    interrupting the display of the first image data on the smartphone by transmitting, from the master device that has received the detection signal, a first icon representative of the at least one sensor to the smartphone to display the first icon on the smartphone in place of the first image data, and
    in response to user selection of the first icon on the smartphone, receiving and forwarding second image data captured by the camera associated with the at least one sensor to the smartphone to display the second image data on the smartphone in place of the first image data,
   wherein the smartphone is connectable to a mobile phone network to communicate with other mobile telephones.

14. The home monitoring method of claim 13, wherein the first icon representative of the at least one sensor is associated with a display of a location of the at least one sensor.

15. The home monitoring method of claim 13, wherein the first icon representative of the at least one sensor is associated with a display of a name of the at least one sensor.

16. The home monitoring method of claim 13, wherein the first icon representative of the at least one sensor is associated with a display of text.

17. The home monitoring method of claim 13, wherein the home monitoring system comprises at least one notification destination device communicable with the master device, and the master device includes a storage configured to store a notification destination list, in which the at least one sensor is correlated with the at least one notification destination device, the home monitoring method further comprising:
   transmitting, from the master device, an event detection notification audio indicative of that the at least one sensor has detected the defined event, a defined number of times, to the at least one notification destination device that is correlated with the at least one sensor having detected the defined event, and
   outputting, from the at least one notification destination device, the event detection notification audio the defined number of times.

18. The home monitoring method of claim 17, wherein the at least one notification destination device is a cordless handset.

19. The home monitoring method of claim 13, wherein the home monitoring system comprises a plurality of sensors configured to defect a plurality of defined events, respectively, and to communicate with the master device according to the communication protocol, the home monitoring method comprising:
   receiving, at the master device, a plurality of detection signals from the plurality of sensors having detected the plurality of defined events, respectively, and
   transmitting, from the master device that has received the plurality of detection signals, plural first icons respectively representative of the plurality of sensors, via the wireless LAN router, to the smartphone to display the plural first icons on the smartphone.

20. The home monitoring method of claim 13, comprising:
   transmitting, from the master device that has received the detection signal, a stop icon to the smartphone to display the stop icon adjacent to the first icon on the smartphone, and
   in response to user selection of the stop icon on the smartphone, switching the display of the first icon and the stop icon to the display of the first image data on the smartphone.

* * * * *